(12) United States Patent
Dawes

(10) Patent No.: US 10,579,401 B2
(45) Date of Patent: Mar. 3, 2020

(54) SYSTEMS AND METHODS FOR PROVIDING A VIRTUAL ASSISTANT TO ACCOMMODATE DIFFERENT SENTIMENTS AMONG A GROUP OF USERS BY CORRELATING OR PRIORITIZING CAUSES OF THE DIFFERENT SENTIMENTS

(71) Applicant: Rovi Guides, Inc., San Carlos, CA (US)

(72) Inventor: Charles Dawes, Ryton (GB)

(73) Assignee: Rovi Guides, Inc., San Jose, CA (US)

( * ) Notice: Subject to any disclaimer, the term of this patent is extended or adjusted under 35 U.S.C. 154(b) by 435 days.

(21) Appl. No.: 15/629,472

(22) Filed: Jun. 21, 2017

(65) Prior Publication Data
US 2018/0373547 A1    Dec. 27, 2018

(51) Int. Cl.
| | |
|---|---|
| G06F 3/048 | (2013.01) |
| G06F 9/451 | (2018.01) |
| G06F 3/16 | (2006.01) |
| G10L 25/63 | (2013.01) |
| H04N 21/442 | (2011.01) |
| H04N 21/4788 | (2011.01) |
| H04N 21/45 | (2011.01) |
| G06F 16/951 | (2019.01) |
| G06F 16/9032 | (2019.01) |
| H04N 21/466 | (2011.01) |
| G06F 3/0482 | (2013.01) |
| G10L 15/26 | (2006.01) |

(52) U.S. Cl.
CPC .............. *G06F 9/453* (2018.02); *G06F 3/167* (2013.01); *G06F 16/90332* (2019.01); *G06F 16/951* (2019.01); *G10L 25/63* (2013.01); *H04N 21/44218* (2013.01); *H04N 21/4532* (2013.01); *H04N 21/4668* (2013.01); *H04N 21/4788* (2013.01); *G06F 3/0482* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 6,239,794 | B1 | 5/2001 | Yuen et al. |
| 6,564,378 | B1 | 5/2003 | Satterfield et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 9,525,912 | B1 | 12/2016 | Israelian et al. |
| 2002/0174430 | A1 | 11/2002 | Ellis et al. |

(Continued)

*Primary Examiner* — Thanh T Vu
(74) *Attorney, Agent, or Firm* — Haley Guiliano LLP

(57) ABSTRACT

Systems and methods are disclosed herein for providing, to a group of users, a virtual assistant with customized avatar sentimental and behavioral characteristics to accommodate different sentiments among the group of users. When the media guidance application is configured to serve a group of users, who may exhibit different moods or sentiments, the media guidance application may configure the virtual assistant to accommodate the different sentiments of the group of users. For example, the media guidance application may determine sentimental and behavioral characteristics to configure the virtual assistant based on a context of the split sentiments of the group of users, a particular sentiment that has a higher priority, and/or the like.

20 Claims, 10 Drawing Sheets

(56) References Cited

U.S. PATENT DOCUMENTS

| | | | |
|---|---|---|---|
| 2004/0221224 A1* | 11/2004 | Blattner | H04L 12/1822 715/201 |
| 2005/0251827 A1 | 11/2005 | Ellis et al. | |
| 2009/0177976 A1* | 7/2009 | Bokor | G06F 3/0481 715/753 |
| 2009/0254859 A1* | 10/2009 | Arrasvuori | G06Q 10/10 715/810 |
| 2010/0153885 A1 | 6/2010 | Yates | |
| 2011/0029889 A1* | 2/2011 | Karstens | G06N 3/006 715/745 |
| 2011/0296324 A1* | 12/2011 | Goossens | G06Q 10/10 715/763 |
| 2015/0007229 A1* | 1/2015 | Chang | H04N 7/17318 725/40 |
| 2015/0264146 A1* | 9/2015 | Cudak | G06F 16/9535 379/142.01 |
| 2016/0127796 A1* | 5/2016 | Wuchter | H04N 21/4882 725/34 |

* cited by examiner

SYSTEMS AND METHODS FOR PROVIDING A VIRTUAL ASSISTANT TO ACCOMMODATE DIFFERENT SENTIMENTS AMONG A GROUP OF USERS BY CORRELATING OR PRIORITIZING CAUSES OF THE DIFFERENT SENTIMENTS

BACKGROUND

In related art systems, virtual personal assistants, which may take a form as a software agent, may perform tasks, provide information or service to a user. Some related art systems may provide a virtual assistant in an animated character such that the virtual assistant may provide an interactive user experience with the user. Some related art systems may customize the virtual assistant to provide information to the user based on user preference. For example, when a user asks the virtual assistant "what should I watch tonight," the virtual assistant may retrieve the user profile and recommend one or more media programs based on user interests indicated by the user profile and/or viewing history of the user. However, in related art systems, the virtual assistant is usually designed for an individual user. Thus, the existing virtual assistant does not accommodate different preferences and/or different needs of a group of users.

SUMMARY

Systems and methods are disclosed herein for providing, to a group of users, a virtual assistant with customized avatar sentimental and behavioral characteristics to accommodate different sentiments among the group of users. For example, a media guidance application may provide a virtual assistant via a user interface to a group of users. The media guidance application may configure characteristics of the virtual assistant, e.g., appearance, voice, tone, behavior, content to be provided, etc., based on a detected sentiment of a user. For example, when a user exhibits a "happy" mood, the media guidance application may configure a virtual assistant to engage in a similar "happy" mood to interact with the user. When the media guidance application is configured to serve a group of users, who may exhibit different moods or sentiments, e.g., one user may appear to be "happy," while another user may appear to be "sad," etc., the media guidance application may need to configure the virtual assistant to accommodate the different sentiments of the group of users. For example, the media guidance application may determine sentimental and behavioral characteristics to configure the virtual assistant based on a context of the split sentiments of the group of users, a particular sentiment that has a higher priority, and/or the like.

To this end and others, in some aspects of the disclosure, the media guidance application may receive a request to initiate a virtual assistant. For example, the media guidance application may launch a virtual assistant on user equipment. The media guidance application may then identify a first user and a second user from an environment. For example, the media guidance application may engage a camera, an audio recorder, a location sensor, and/or other sensors to detect the first user and the second user in a room. In response to identifying the first user and the second user from the environment, the media guidance application may monitor user activities of the first user and the second user in the environment. For example, the media guidance application may engage an audio recorder to record a vocal communication between the first user and the second user.

In some embodiments, during the monitoring, the media guidance application may determine a first sentiment descriptor corresponding to the first user and a second sentiment descriptor corresponding to the second user based at least in part on the user activities. For example, the media guidance application may monitor biometric data, e.g., pulse rate, blood pressure, body temperature, etc., of the users to determine the sentiment descriptors. The media guidance application may obtain, via a wearable device carried by the first user, biometric data relating to the first user. The media guidance application may then extract characteristics from the biometric data, e.g., a sudden increase or decrease in pulse rate, a waveform representing the pulse, etc. The media guidance application may map, based on a mapping table of sentiment descriptors and biometric characteristics, the characteristics to a plurality of mapped sentiment descriptors. Each sentiment descriptor from the plurality of mapped sentiment descriptors corresponds to a matching score. For example, a pulse rate that is higher than normal may be mapped to different descriptors such as but not limited to "excited," "nervous," etc. The media guidance application may then select a sentiment descriptor from the plurality of mapped sentiment descriptors that has the highest matching score as the first descriptor.

In some embodiments, the media guidance application may determine the sentiment descriptors by analyzing a vocal communication uttered by the users. For example, the media guidance application may obtain, from the monitoring, a voice communication from the first user, and extract a plurality of keywords from the voice communication by speech recognition. For each keyword from the plurality of keywords, the media guidance application may query a database of sentiment descriptors based on each respective keyword to obtain one or more sentiment descriptors that match or more keywords from the plurality of keywords. In response to obtaining the one or more sentiment descriptors, the media guidance application may select a sentiment descriptor that matches the most keywords from the plurality of keywords as the first descriptor.

In some embodiments, the media guidance application may further determine the sentiment descriptors by analyzing the tone of the vocal communication from the first user, if the keyword query does not match any sentiment descriptor. For example, in response to obtaining no sentiment descriptor from the querying, the media guidance application may obtain a speech waveform representing the vocal communication. The media guidance application may then determine a frequency pattern of the speech waveform representing a tone of the vocal communication. The media guidance application may then determine the first sentiment descriptor corresponding to the frequency pattern, for example, based on a tone-sentiment mapping table.

In some embodiments, the media guidance application may determine whether a first cause of the first sentiment descriptor is identifiable and a second cause of the second sentiment descriptor is identifiable based on the user activities. The media guidance application may perform a variety of procedures to attempt to identify the first (and second) cause of the first (and second) sentiment descriptor, for example, by analyzing a context of the vocal communication, identifying possible events relating to user interests, and/or the like. For each keyword from the plurality of keywords, the media guidance application may determine whether each respective keyword identifies the first cause, for example, whether the first user explains the first cause in the vocal communication. In response to determining that one or more keywords from the plurality of keywords identify the first cause, the media guidance application may identify the first cause as a combination of the one or more keywords. In response to determining that no keyword from the plurality of keywords identifies the first cause, the media guidance application may retrieve a profile of the first user, and obtain a plurality of recent electronic communications associated with the profile of the first user, for example, any public message or post the first user posted, received, and/or being tagged with during a period of time. For each electronic communication from the plurality of recent electronic communications, the media guidance application may determine whether the respective electronic communication identifies the first cause. In response to determining that no electronic communication identifies the first cause, the media guidance application may identify a plurality of topics of interests from the profile of the first user. The media guidance application may obtain electronic communications from users relating to each topic from the plurality of topics, for example, social media posts that have a hashtag relating to the respective topic. The media guidance application may then determine whether any electronic communication from users indicates a sensational event on the respective topic of the plurality of topics. In response to determining that an electronic communication from users indicates a sensational event on the respective topic, the media guidance application may determine whether the first sentiment descriptor matches a sentiment indicated by the sensational event. In response to determining that the first sentiment descriptor matches the sentiment indicated by the sensational event, the media guidance application may identify the sensational event as the first cause. For example, when a user's favorite soccer team wins a soccer game, the media guidance application may identify the success of the soccer team as a cause to a sentiment descriptor of "excited," "happy," etc. In response to determining that the first sentiment descriptor does not match the sentiment indicated by the sensational event, the media guidance application may determine that the first cause of the first sentiment descriptor is unidentifiable.

In some embodiments, in response to determining that the first cause of the first sentiment descriptor is unidentifiable, the media guidance application may provide a first avatar option of a first previously used avatar for the first user and a second avatar option of a second previously used avatar for the second user. The media guidance application may receive a selection of one of the first avatar option and the second avatar option.

In some embodiments, in response to determining that the first cause of the first sentiment descriptor and the second cause of the second sentiment descriptor are identifiable, the media guidance application may identify the first cause and the second cause, and determine whether the first cause and the second cause are related. For example, the media guidance application may obtain a first plurality of electronic communications from users relating to the first cause, and identify a first plurality of context indicators (e.g., hashtags, etc.) from the first plurality of electronic communications. Similarly, the media guidance application may obtain a second plurality of electronic communications from users relating to the second cause, and identify a second plurality of context indicators (e.g., hashtags, etc.) from the second plurality of electronic communications. The media guidance application may determine an overlap percentage between the first plurality of context indicators and the second plurality of context indicators. For example, the media guidance application may identify the plurality of common parameters based on an intersection between the first plurality of context indicators and the second plurality of context indicators, and count the total number of context indicators in the intersect. In response to determining that the overlap percentage is higher than a relevance threshold, determining that the first cause and the second cause are related. In response to determining that the overlap percentage is no higher than the relevance threshold, the media guidance application may determine that the first cause and the second cause are unrelated.

In some embodiments, in response to determining that the first cause and the second cause are related, the media guidance application may determine a plurality of common parameters between the first cause and the second cause, and determining avatar sentimental and behavioral characteristics based on the common parameters. For example, if the first cause and the second cause are both related to a sports event, the media guidance application may select an avatar relating to a sports commentator, and provide content relating to the sports event to the users.

In some embodiments, in response to determining that the first cause and the second cause are unrelated, the media guidance application may determine a first engagement level between the first user and the virtual assistant, and a second engagement level between the second user and the virtual assistant. The media guidance application may determine a first importance score corresponding to the first cause and a second importance score corresponding to the second cause based on an event importance table. For example, the media guidance application may retrieve, from a database, the event importance table that maps a type of event to an importance score, and determine one or more query terms based on the first cause. The media guidance application may then query the event importance table based on the one or more query terms to obtain one or more respective importance scores, and calculate the first importance score by taking an average of the one or more respective importance scores. The media guidance application may then determine a first priority score corresponding to the first user by taking a first weighted sum of the first engagement level with a first weight and the first importance score with a second weight, and a second priority score corresponding to the second user by taking a second weighted sum of the second engagement level with the first weight and the second importance score with the second weight. In response to determining that the first priority score is higher than the second priority score (e.g., the first user may be given higher priority), the media guidance application may determine avatar sentimental and behavioral characteristics based on the first cause.

In some embodiments, the media guidance application may present, via a user interface, the virtual assistant with the determined avatar sentimental and behavioral characteristics to the first user and the second user.

In some embodiments, in response to presenting, via the user interface, the virtual assistant with the determined avatar sentimental and behavioral characteristics to the first user and the second user, the media guidance application may receive an interactive action relating to the virtual assistant from the first user. For example, the first user may ask the avatar a question, may answer a question asked by the avatar, and/or the like. The media guidance application may determine whether the determined avatar sentimental and behavioral characteristics are consistent with the first sentiment descriptor corresponding to the first user. For example, the media guidance application may have given priority to the second user and generate the avatar based on the second cause, but only the first user continues to interact with the avatar. In response to determining that the determined avatar sentimental and behavioral characteristics are inconsistent with the first sentiment descriptor corresponding to the first user, the media guidance application may adjust the avatar sentimental and behavioral characteristics based on the first sentiment descriptor.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
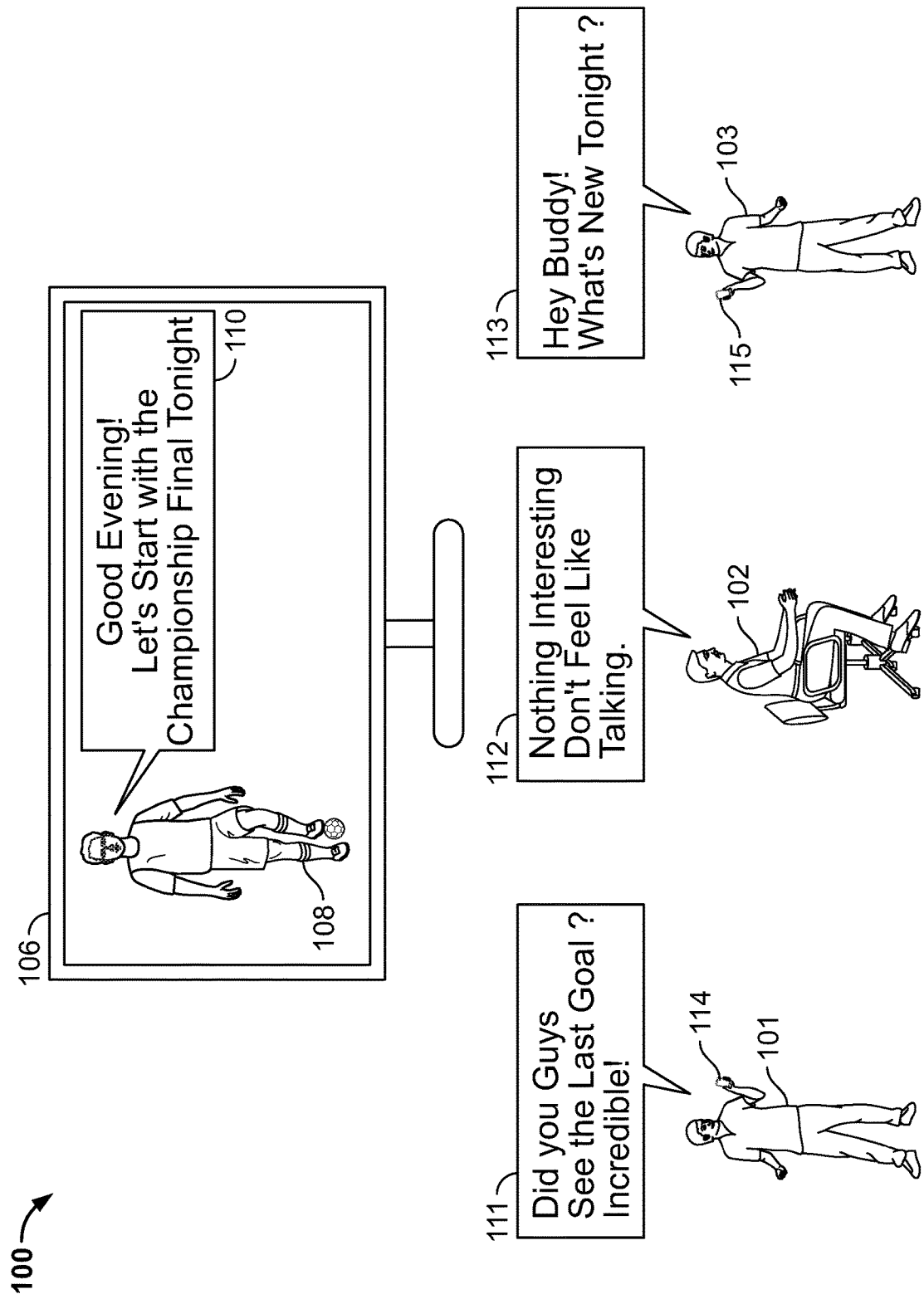
FIG. 1 depicts an illustrative diagram for providing a virtual assistant to accommodate different sentiments among a group of users, in accordance with some embodiments of the disclosure.

Systems and methods are disclosed herein for providing, to a group of users, a virtual assistant with customized avatar sentimental and behavioral characteristics to accommodate different sentiments among the group of users.

In some embodiments, the media guidance application may customize a virtual assistant to interact with users. For example, the media guidance application may identify a user, and customize the virtual assistant with an avatar character in response to preference information relating to the user. For another example, the media guidance application may configure sentimental and behavioral characteristics of the avatar of the virtual assistant, e.g., appearance, voice, tone, behavior, content to be provided, etc., based on user preferences and user sentiment. For example, when a user's favorite soccer team has won an important soccer game, the user may articulate to the virtual assistant avatar in an acclaimed tone "anything new about the Championship Final?" The media guidance application may then identify the user is exhibiting a "happy" mood because of the soccer game, and may configure a virtual assistant with an avatar relating to the soccer game (e.g., a mascot of the user's favorite team, an animated figure of the user's favorite player or sports commentator, etc.) to engage in a similar "happy" mood to interact with the user.

In some implementations, the media guidance application may be configured to serve a group of users, who may exhibit different moods or sentiments, e.g., one user may appear to be "happy," while another user may appear to be "sad," etc. The media guidance application may then need to configure the virtual assistant to accommodate the different sentiments of the group of users. For example, the media guidance application may be configured to serve a family of users: the father may be excitedly telling others about his favorite soccer team winning the Championship Final, while the son may respond to his father in a disappointed tone that he supports the opponent team. The media guidance application may capture the different moods among the father and the son, but identify that both the father and the son care about the same event, e.g., the Championship Final. The media guidance application may then configure an avatar relating to the game (e.g., a mascot for the league, which is neutral to both teams) and provide content relating to the final game to the father and the son. In this way, in a social setting, the group of users does not need to each individually launch and interact with their individually customized personal assistant in order to obtain personalized service. Thus, by engaging the media guidance application to accommodate a group of users based on their different preferences, moods or sentiments, the group of users may achieve an enhanced shared experience.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments of the virtual assistant described herein may be implemented by a media guidance application, or any other virtual assistant tool that includes an interactive user interface.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

FIG. 1 depicts an illustrative diagram for providing a virtual assistant to accommodate different sentiments among a group of users, in accordance with some embodiments of the disclosure. Environment 100 provides a social setting including a group of users 101-103. The media guidance application, which may be implemented in connection with user equipment 106, may provide a virtual assistant 108 in an avatar form to the group of users 101-103. As used herein, the term "virtual assistant" is defined to mean an agent application that is configured to receive a communication from, provide a communication to, and/or perform task or service to a user. As used herein, the term "avatar" is defined to mean an interactive and automated character that has any animated characteristics such as a physical appearance, a voice, a behavioral pattern or other physical characteristics.

In some embodiments, the media guidance application may identify a group of users from an environment, e.g., users 101-103 in environment 100. For example, the media guidance application may engage a camera, an audio recorder, a location sensor, and/or other sensors to detect and identify users 101-103 based on facial recognition, voice signatures, and/or the like. For another example, the media guidance application may wirelessly communicate with a mobile device, e.g., user equipment 114 carried by user 101, or wearable device 115 carried by user 103, etc., to identify user 101. In response to identifying the first user and the second user from the environment, the media guidance application may monitor user activities of users 101-103 in the environment. For example, the media guidance application may engage an audio recorder to record a vocal communication between the first user and the second user. Embodiments of identifying users and monitoring user activities from a watching scene are described in greater detail in commonly owned and co-pending PCT International Application Nos. PCT/US2017/031755 and PCT/US2017/031765, both filed May 9, 2017, which are hereby incorporated by reference herein in their entireties.

In some embodiments, during the monitoring, the media guidance application may determine sentiment descriptors, such as "excited," "stressed," "calm," "neutral," "sad," "depressed," and/or the like, corresponding to the users based at least in part on the user activities. For example, the media guidance application may monitor and determine the sentiment descriptors based on biometric data, e.g., pulse rate, blood pressure, body temperature, etc. The media guidance application may obtain, via mobile device 114 carried by user 101 and/or wearable device 115 carried by user 115, biometric data relating to user 101 and user 103 (e.g., pulse rate, blood pressure, body temperature, etc.). The media guidance application may then extract characteristics from the biometric data, e.g., a sudden increase or decrease in pulse rate, a waveform representing the pulse, etc. The media guidance application may map, based on a mapping table of sentiment descriptors and biometric characteristics, the characteristics to a plurality of mapped sentiment descriptors. Each sentiment descriptor from the plurality of mapped sentiment descriptors corresponds to a matching score. For example, a pulse rate that is higher than normal may be mapped to different descriptors such as but not limited to "excited," "nervous," etc. The media guidance application may then select a sentiment descriptor from the plurality of mapped sentiment descriptors that has the highest matching score as the first descriptor. For another example, the media guidance application may monitor users' facial expression, physical activities as indicators of their sentiments. For example, if the media guidance application detects that user 103 is standing with his or her arms raised up, corresponding to an "excited" pose, user 103 may be determined as "excited" or "thrilled." For another example, if the media guidance application detects that user 102 is lying on a couch with no or slow physical movement, user 102 may be determined as "sad" or "depressed." Determination of sentiment descriptors based on biometric characteristics of a user is discussed in further detail in commonly owned U.S. Pat. No. 9,525,912, issued on Dec. 20, 2016, which is hereby incorporated by reference herein in its entirety.

In some embodiments, the media guidance application may determine the sentiment descriptors by analyzing a vocal communication uttered by the users. The media guidance application may obtain, from the monitoring, a voice communication from a user, and extract a plurality of keywords from the voice communication by speech recognition. For example, as shown in FIG. 1, the media guidance application may capture user 101 articulating "did you guys see the latest goal? Incredible!" The media guidance application may in turn capture keywords such as "goal," "incredible" from the vocal communication 111 of user 101. As another example, the media guidance application may capture user 102 articulating "nothing interesting. Don't feel like talking." The media guidance application may in turn capture keywords such as "nothing," "interesting," "(not) feel like" from the vocal communication 102.

For each keyword from the plurality of keywords, the media guidance application may query a database of sentiment descriptors based on each respective keyword to obtain one or more sentiment descriptors that match one or more keywords from the plurality of keywords. For example, the extracted keyword "goal" from vocal communication 111 may be mapped to sentiment descriptors "thrilled," "excited," "intense," etc., and the extracted keyword "incredible" from vocal communication 111 may be mapped to sentiment descriptors "thrilled," "shocked," "excited," etc. Similarly, the extracted keywords "nothing interesting" from vocal communication 112 may be mapped to sentiment descriptors "negative," "calm," "depressed," "disappointed," etc., and the extracted keywords "(not) feel like talking" may be mapped to sentiment descriptors "sad," "tired," "exhausted," "unhappy," "depressed," etc. In response to obtaining the one or more sentiment descriptors, the media guidance application may select a sentiment descriptor that matches the most keywords from the plurality of keywords of a respective vocal communication as the sentiment descriptor corresponding to the respective user. For example, based on keyword mapping of vocal communication 111, the media guidance application may determine to allocate sentiment descriptors "thrilled" and "excited" to user 101 as these descriptors correspond to most keywords from vocal communication 111. As another example, the media guidance application may determine to allocate sentiment descriptors "depressed" to user 102 as this descriptor corresponds to most keywords from vocal communication 112.

In some embodiments, the media guidance application may further determine the sentiment descriptors by analyzing the tone of the vocal communication from the user, if the keyword query does not match any sentiment descriptor. For example, the media guidance application may capture vocal communication 113 "Hey buddy! what's new tonight?" from user 103, and extract keywords such as "hey," "buddy," "new," "tonight" from the vocal communication. However, the extracted keywords may not be indicative of human emotions and thus the media guidance application may not identify any sentiment descriptor from the mapping table based on these keywords. In response to obtaining no sentiment descriptor from the querying, the media guidance application may obtain a speech waveform representing vocal communication 113. The media guidance application may then determine the frequency pattern of the speech waveform representing the tone of vocal communication 113. The media guidance application may then determine a sentiment descriptor corresponding to the frequency pattern, for example, based on a tone-sentiment mapping table. In this respective example, the media guidance application may determine that user 103 articulate vocal communication 113 in a heightened tone, and thus identify a sentiment descriptor of "thrilled" or "happy." The media guidance application may store the determined sentiment descriptors corresponding to each user at storage 408 or data source 518 accessible via communications network 514 as further discussed in FIGS. 4 and 5.

In some embodiments, when the group of users are determined to have different sentiment descriptors, e.g., user 101 is "thrilled" and "excited," user 103 is "happy," but user 102 is "depressed," the media guidance application may determine whether the causes of the different sentiments are identifiable, e.g., based on the user activities, content of vocal communications, electronic communications among users, etc. The media guidance application may perform a variety of procedures to attempt to identify the first (and second) cause of the first (and second) sentiment descriptor, for example, by analyzing a context of the vocal communication, identifying possible events relating to user interests, and/or the like.

For each keyword from the plurality of keywords, the media guidance application may determine whether each respective keyword from a respective vocal communication identifies a possible cause, for example, whether the user self-explains the cause of his or her mood or sentiment. In response to determining that one or more keywords from the plurality of keywords identify the cause, the media guidance application may identify the cause as a combination of the one or more keywords. For example, the media guidance application may identify that keywords "goal" and "incredible" from vocal communication 111 may provide a context relating to the sentiment of user 101, e.g., because of an "incredible" "goal." As another example, the media guidance application may identify that keywords "nothing interesting" or "talking" from vocal communication 112, or keywords "hey," "buddy," "new," or "tonight" from vocal communication 113 do not identify a cause for the corresponding user's sentiment.

In response to determining that no keyword from the plurality of keywords identifies the cause, e.g., for user 102 and user 103, the media guidance application may retrieve a profile of the respective user, and obtain a plurality of recent electronic communications associated with the profile of the respective user. For example, the recent electronic communications may include any public message or post the respective user posted, received, and/or being tagged with during a period of time (e.g., the past 1 hour, 2 hours, 5 hours, etc.), including but not limited to any group messages, social media posts, hashtags, likes, comments, and/or the like. For each electronic communication from the plurality of recent electronic communications, the media guidance application may determine whether the respective electronic communication identifies a cause of the sentiment of the corresponding user. For example, if the media guidance application identifies that user 103 has shared a post on social media including keywords and/or hashtags such as "congratulations," "win," "champion," etc., the media guidance application may identify an indicated soccer game as the cause for the "thrilled" and "happy" sentiment of user 103.

In response to determining that no electronic communication identifies the cause, the media guidance application may identify a plurality of topics of interests from the profile of the respective user. For example, if no recent electronic communication corresponds to user 103 is identified, the media guidance application may identify topics reflecting user interests (e.g., "soccer," "sports," "Real Madrid," etc.) of user 103, and then determine whether any event relating to the user interest has recently occurred. The media guidance application may obtain electronic communications from users relating to each topic from the plurality of topics, for example, social media posts that have a hashtag (e.g., "soccer," "sports," "Real Madrid," etc.) relating to the respective topic. The media guidance application may then determine whether any electronic communication from users indicates a sensational event on the respective topic of the plurality of topics. For example, if social media posts with the hashtag "#realmadrid" also include an indication of "Championship," "UEFA Final," the media guidance application may identify UEFA champion league final as relating to the respective user's sentiment.

In response to determining that an electronic communication from users indicates a sensational event (e.g., "UEFA Champion Final") on the respective topic (e.g., "real madrid," "championship,"), the media guidance application may determine whether the sentiment descriptor (e.g., "thrilled," "excited," etc.) of user 103 matches a sentiment indicated by the sensational event. For example, the media guidance application may obtain information from the plurality of electronic communications that Real Madrid has won the UEFA Champion Final, and may in turn derive that users with a user interest in "Real Madrid" have a positive sentiment, which is consistent with the identified sentiment descriptor "thrilled," "excited" with user 103.

In response to determining that the sentiment descriptor matches the sentiment indicated by the sensational event, the media guidance application may identify the sensational event as the respective cause. In the respective example, the media guidance application may identify the success of "Real Madrid" as the cause to a sentiment descriptor of "excited," "thrilled" for user 103. The media guidance application may store the cause corresponding to a sentiment descriptor for each user at storage 408 or data source 518 accessible via communications network 514 as further discussed in FIGS. 4 and 5.

Alternatively, in response to determining that the sentiment descriptor does not match the sentiment indicated by the sensational event, the media guidance application may determine that the cause of the sentiment descriptor is unidentifiable. For example, for user 102, if the media guidance application has identified, in a similar manner, that user 102 has an interest in "soccer" and "Real Madrid," and that "Real Madrid" has just won "UEFA Championship Final," the media guidance application may predict a positive sentiment for user 102, which is inconsistent with the determined sentiment descriptor of "depressed" with user 102. In such scenarios, the media guidance application may identify that the cause for the sentiment of user 102 is unknown.

Figure 2:
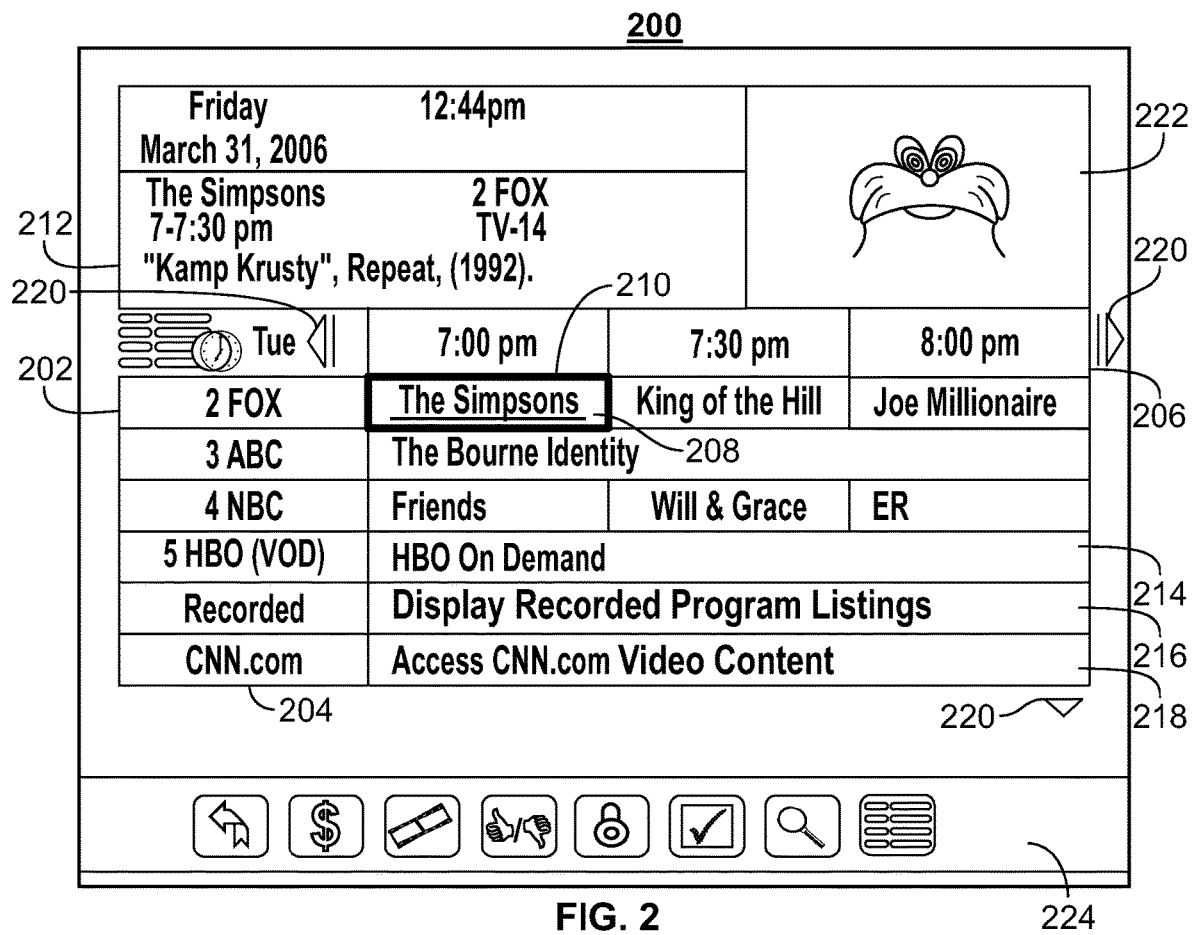
FIG. 2 shows an illustrative embodiment of a display screen that may be used to provide media guidance application listings and other media guidance information, in accordance with some embodiments of the disclosure.
Figure 5:
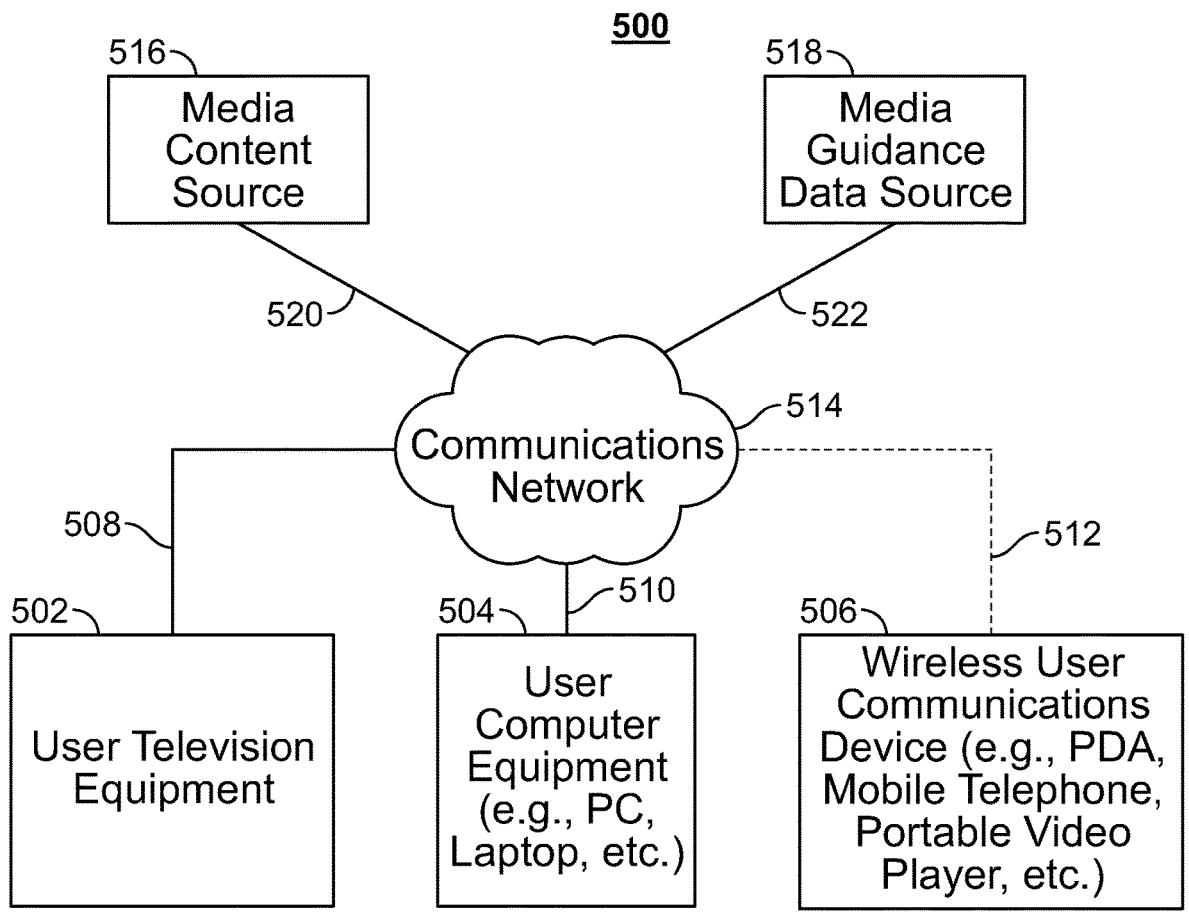
FIG. 5 is a block diagram of an illustrative media system in accordance with some embodiments of the disclosure.

In some embodiments, in response to determining that the cause of the sentiment descriptor of a user is unidentifiable, the media guidance application may provide different options of avatars for the users to select (e.g., displayed at user equipment 106 in FIG. 1, and/or via the display 412 in FIG. 2, or any of 502, 504 and 506 in FIG. 5). For example, the media guidance application may provide a first avatar option of a first previously used avatar for user 101 and a second avatar option of a previously used avatar for user 102. The media guidance application may receive a selection of one of the first avatar option and the second avatar option. In another embodiment, the media guidance application may elect to determine an avatar for the virtual assistant based on a priority of users 101-103, e.g., based on the total number of times or the frequency of their interaction with the virtual assistant.

In some embodiments, in response to determining that at least one cause of the sentiment descriptor of at least one user from users 101-103 is identifiable, the media guidance application may identify the causes. If only one cause corresponding to a sentiment descriptor is identifiable, or causes corresponding to the same or similar sentiment descriptors are identifiable (e.g., the causes for sentiment descriptors for users 101 and 013 that both include "thrilled"), the media guidance application may generate customized avatar sentimental and behavioral characteristics based on the identified cause that relates to the "thrilled" sentiment.

The media guidance application may also determine whether causes that correspond to different sentiments (e.g., "thrilled" and "excited" for user 101 and "depressed" for user 102) are related, which may be determined by analyzing a context of the causes. For example, the media guidance application may obtain a first plurality of electronic communications from users relating to a first cause, and identify a first plurality of context indicators (e.g., hashtags, etc.) from the first plurality of electronic communications. For example, user 101 has been identified with a sentiment descriptor of "excited" and "thrilled" with an identified cause of "an incredible goal. The media guidance application may obtain social media posts that user 101 received, sent or tagged in, or posts that include hashtag "goal" in the past 24 hours and identify common hashtags of the obtained posts, e.g., "penalty," "goal," "Championship Final," etc. Similarly, the media guidance application may obtain a second plurality of electronic communications from users relating to a second cause, and identify a second plurality of context indicators (e.g., hashtags, etc.) from the second plurality of electronic communications. For example, user 102 has been identified with a sentiment descriptor of "depressed." If the cause of the sentiment for user 102 is identifiable, the media guidance application may obtain social media posts that have been used to identify the cause for the sentiment of user 102 as described above. For example, if a profile of user 102 shows user 102 has an interest in "soccer," "Barcelona," social media posts that have been used to identify the cause of the sentiment for user 102 may include hashtags such as but not limited to "Championship Final," "loss," "fail," "bar exam retake," and/or the like. The media guidance application may determine an overlap percentage between the first plurality of context indicators and the second plurality of context indicators. For example, between user 101 and user 102, although of different sentiment descriptors, the media guidance application may identify that the causes for the sentiments of users 101 and 102 share the context indicator (e.g., hashtags, etc.) of "Championship Final."

In some embodiments, if the shared context indicators between two causes include multiple indicators, the media guidance application may then identify common parameters based on an intersection between the first plurality of context indicators and the second plurality of context indicators, and count the total number of context indicators in the intersect. For example, the media guidance application may calculate an intersection percentage between two causes based on the number of shared context indicators. In response to determining that the overlap percentage is higher than a relevance threshold (e.g., 60%, 70%, etc.), the media guidance application may determine that the two (or more) causes are related. In response to determining that the overlap percentage is no higher than the relevance threshold, the media guidance application may determine that the two (or more) causes are unrelated. In the respective example, although the context indicators for social media posts relating to users 101 and 102 have a shared common indicator such as "Championship Final," a large amount of context indicators for user 102 include "bar exam," "retake," "fail," etc., indicating a different cause for the sentiment of user 102. If the overlap percentage of the context indicators between users 101 and 102 is less than the relevance threshold (e.g., 60%, 70%, etc.), the media guidance application may determine that the cause for the sentiment of user 101, i.e., an "incredible goal" in "Championship Final," is unrelated to the cause for the sentiment of user 101, i.e., "bar exam" fails.

In some embodiments, in response to determining that causes of sentiments of different users are related, the media guidance application may determine a plurality of common parameters between the causes, and determining avatar sentimental and behavioral characteristics based on the common parameters. In the respective example, causes for the sentiments of users 101 and 102 are both related to a sports event "Championship Final," the media guidance application may in turn select an avatar 108 that has an appearance of a soccer player, or a sports commentator, and provide content relating to the sports event to the users, e.g., contents relating to "Championship Final" as shown at 110.

In some embodiments, in response to determining that the causes for the sentiments of users are unrelated or only the cause for the sentiment of one user can be identified, the media guidance application may determine, among the users with different sentiments, a user who has higher priority over other users, and may configure the virtual assistant based on the sentiment of the user with higher priority. The media guidance application may determine a first engagement level between a first user (e.g., user 101) and the virtual assistant 108, and a second engagement level between a second user (e.g., user 102) and the virtual assistant 108. For example, the media guidance application may monitor an amount of interactions between a user and the virtual assistant 108, attention of the user towards user equipment 106, user history of engaging with any virtual assistant, and/or the like. Further discussion of determining whether one or more users are engaged with user equipment 106 can be found in commonly owned and co-pending PCT International Application Nos. PCT/US2017/031755 and PCT/US2017/031765, both filed May 9, 2017, and PCT/US2017/031765, which are hereby incorporated by reference herein in their entireties.

The media guidance application may also determine a metric indicating how important a user's cause of sentiment is, relative to other users" sentiments. For example, the media guidance application may determine a first importance score corresponding to the first cause for user 101 and a second importance score corresponding to the second cause for user 102 based on an event importance table. The event importance table may include event descriptors, event types, corresponding sentiment descriptors to the event, and/or the like. In some embodiments, the media guidance application may store the event importance table at storage 408 or data source 518 accessible via communications network 514 described in relation to FIG. 4 and FIG. 5 below. An example data record of data entries from the event importance table may take a form similar to the following:

```
<importance_table>
    <table_id> 0001 </table_id>
    <update_time> 13:45 </update_time>
    <update_date> xx-xxx-xx </update_date>
    <event_1>
        <id> 001 </id>
        <type_1> personal </type_1>
        <type_2> failure in professional activities </type_2>
        <descriptor> "bar exam," "fail," "retake" </descriptor>
        <sentiment>
            <descriptor_1> "depressed" </descriptor_1>
            <descriptor_2> "sad" </descriptor_2>
            ...
        </sentiment>
        <score> 0.7 </score>
        ...
    </event_1>
    ...
    <event_2>
        <id> 0035 </id>
        <type_1> social </type_1>
        <type_2> sports event </type_2>
        <descriptor> "UEFA," "Championship," "Final"
    </descriptor>
        <sentiment>
            <descriptor_1> "thrilled" </descriptor_1>
            <descriptor_2> "excited" </descriptor_2>
            ...
        </sentiment>
        ...
        <score> 0.45 </score>
        ...
    </event_1>
    ...
</importance_table>
```

In the respective example, the media guidance application may retrieve, from a database, the event importance table that maps a type of event to an importance score, and determine one or more query terms based on the causes for users 101 and 102. For example, for user 101, the media guidance application may query on "Championship"; for user 102, the media guidance application may query on the term "bar exam." The media guidance application may then query the event importance table based on the one or more query terms to obtain one or more respective importance scores, e.g., a score of 0.7 for an event relating to "bar exam," and a score of 0.45 for an event relating to "Championship." When a cause of the user matches with more than one event entries in the importance table, the media guidance application may calculate the importance score by taking an average of the one or more respective importance scores from the importance table.

The media guidance application may then determine a priority score corresponding to a user by taking a weighted sum of the corresponding engagement level with a first weight and the corresponding importance score with a second weight. The first weight and the second weight may be dynamically adjusted, depending on a relative emphasis on user engagement level or the importance of the event. For example, when the cause indicates a live sports event, the media guidance application may configure a higher weight for the importance score to emphasize the impact of a time-sensitive event. In another example, when the user has exhibited a history of intense usage of the virtual assistant, the media guidance application may configure a higher weight for the engagement level. In response to determining that the priority score corresponding to user 102 is higher than the priority score corresponding to user 101, the media guidance application may determine avatar sentimental and behavioral characteristics based on the cause corresponding to user 102. For example, avatar 108 may be configured to soothe the sentiment of user 102.

In some embodiments, the media guidance application may present, via a user interface (e.g., displayed at user equipment 106 in FIG. 1, and/or via the display 412 in FIG. 4, or any of 502, 504 and 506 in FIG. 5), the virtual assistant with the determined avatar sentimental and behavioral characteristics to the group of users, and may monitor user feedback to adjust the avatar if needed. The media guidance application may receive an interactive action relating to the virtual assistant from a user, e.g., any one of users 101-103. For example, when avatar 108 provides "let's start with the Championship Final tonight" at 110, users 101-103 may ask avatar 108 a question, may answer a question asked by the avatar, and/or the like. The media guidance application may determine whether the determined avatar sentimental and behavioral characteristics are consistent with the first sentiment descriptor corresponding to the user who reacts to avatar 108. For example, the media guidance application may have decided the soccer player appearance of avatar 108 based on the sentiment of user 101, who is thrilled at an "incredible goal" from the "Championship Final." In response to avatar 108, user 102 may respond to avatar 108, while user 101 may not be responsive. The media guidance application may receive a response from user 102 interacting with avatar 108, and identify that avatar 108 does not correspond to the sentiment descriptor of user 102, who has been identified as "depressed." In response to determining that the determined avatar sentimental and behavioral characteristics are inconsistent with the sentiment descriptor corresponding to user 102, the media guidance application may adjust the avatar sentimental and behavioral characteristics based on the sentiment descriptor of "depressed" for user 102, e.g., by using a comforting and soothing avatar such as a favorite cartoon character of user 102.

Figure 3:
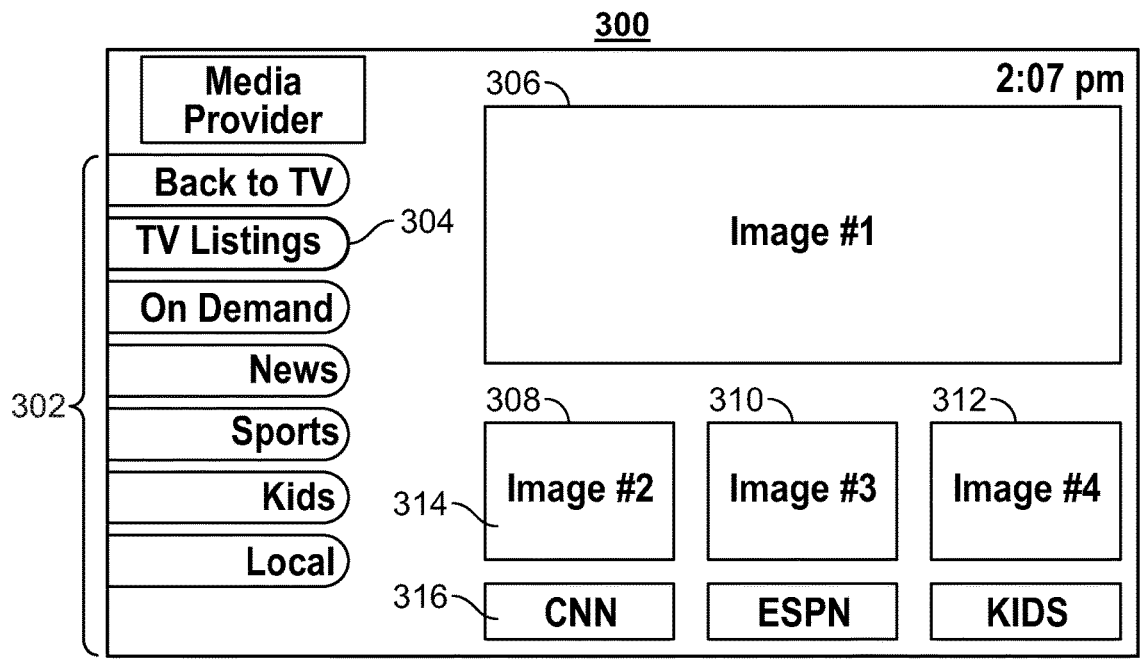
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
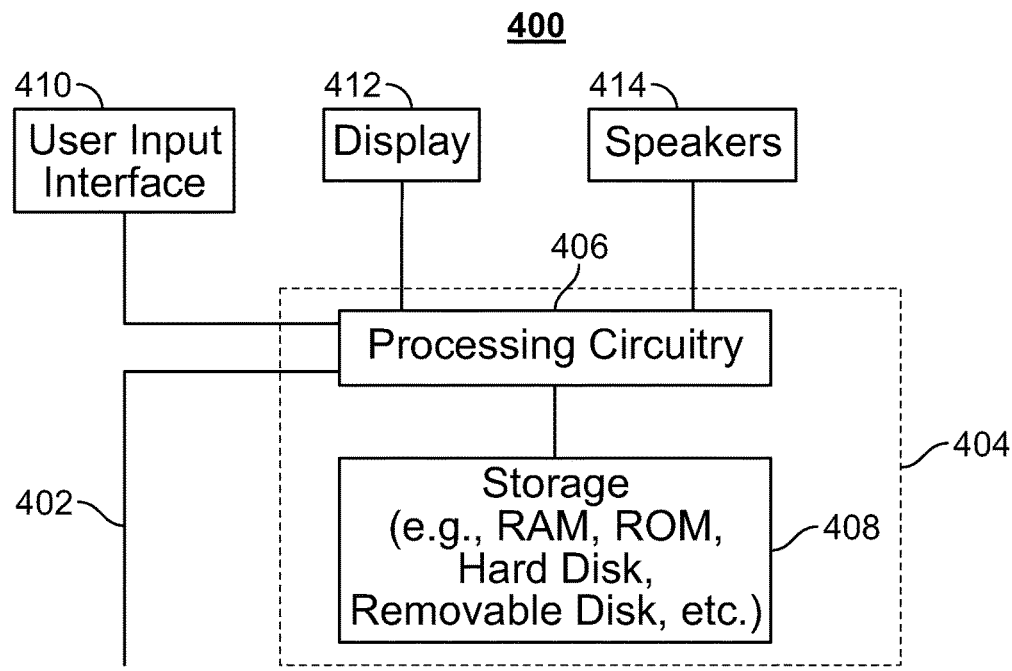
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
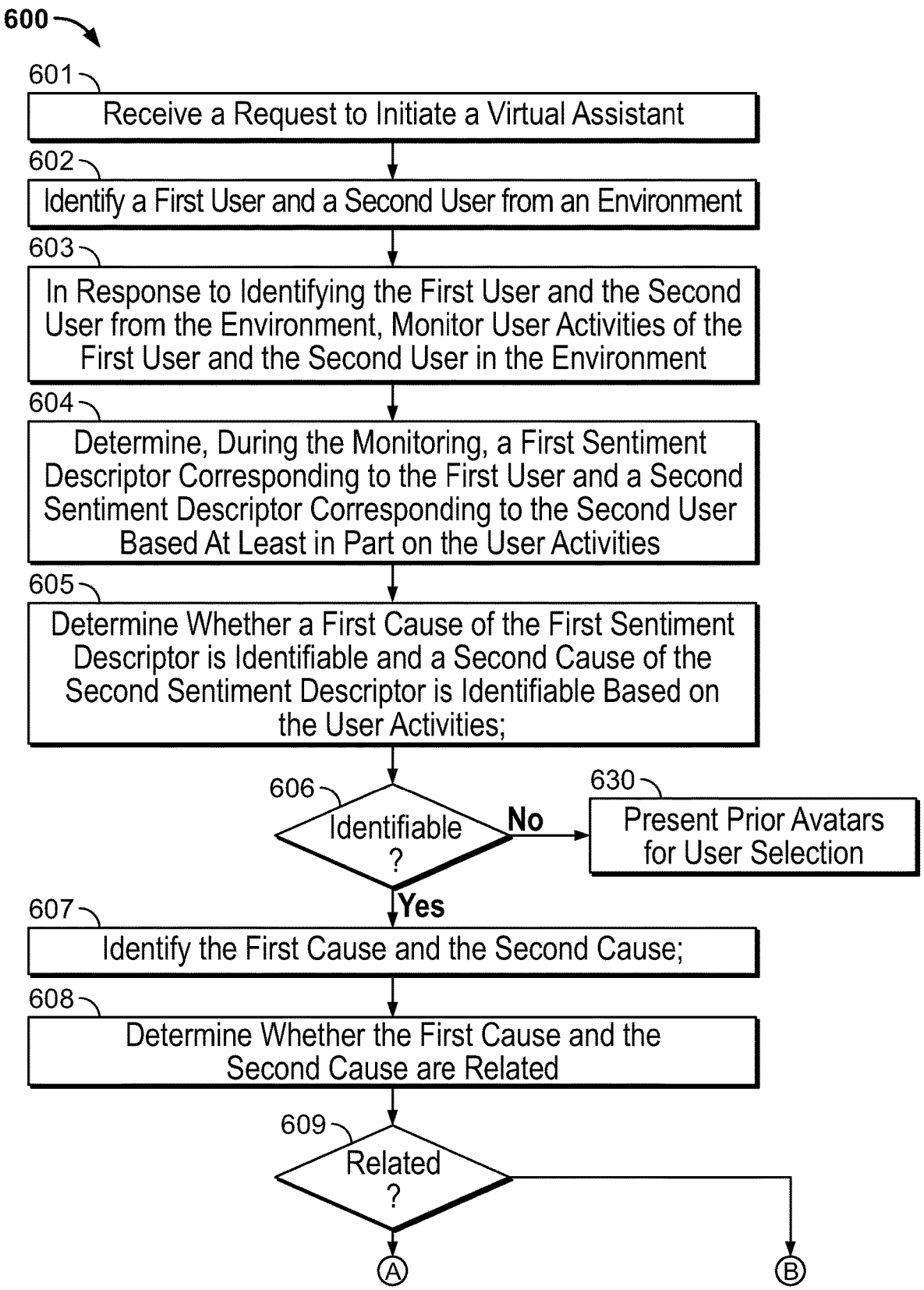
FIG. 6 depicts an illustrative flowchart of a process for providing a virtual assistant to accommodate different sentiments among a group of users, in accordance with some embodiments of the disclosure.
Figure 6:
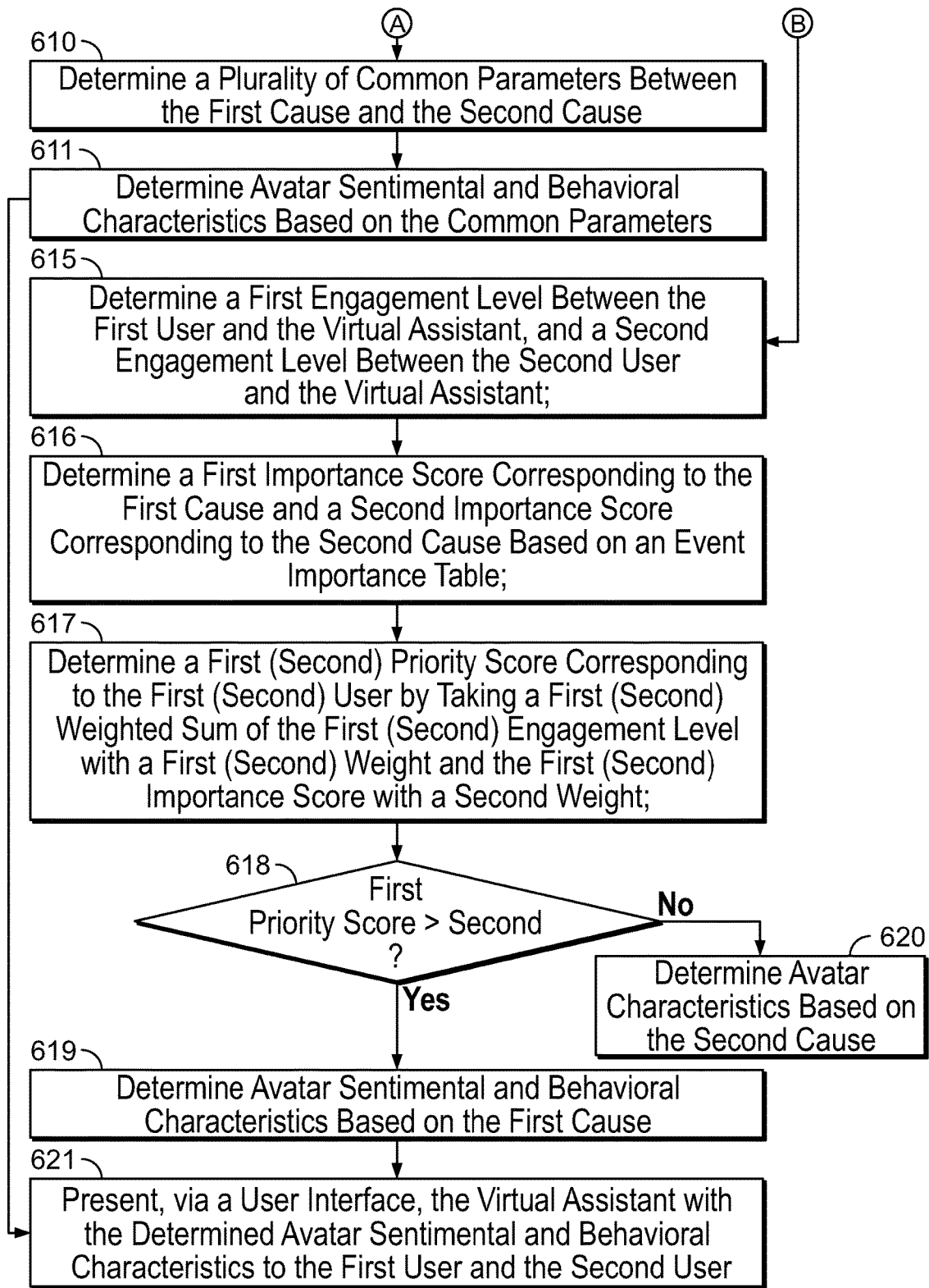

FIG. 6 depicts an illustrative flowchart of a process for providing a virtual assistant to accommodate different sentiments among a group of users, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 600 begins at 601, where control circuitry 404 receives a request to initiate a virtual assistant (e.g., displayed at user equipment 106 in FIG. 1, and/or via the display 412 in FIG. 2, or any of 502, 504 and 506 in FIG. 5). At 602, control circuitry 404 identifies a first user (e.g., user 101) and a second user (e.g., user 102 or 103) from an environment (e.g., via user input interface 410 in FIG. 4). At 603, in response to identifying the first user and the second user from the environment, control circuitry 404 monitors user activities of the first user and the second user in the environment (e.g., via user input interface 410 in FIG. 4). At 604, control circuitry 404 determines, during the monitoring, a first sentiment descriptor corresponding to the first user and a second sentiment descriptor corresponding to the second user based at least in part on the user activities. At 605, control circuitry 404 determines whether a first cause of the first sentiment descriptor is identifiable and a second cause of the second sentiment descriptor is identifiable based on the user activities.

At 606, if the causes are identifiable, process 600 continues to 607, where control circuitry 404 identifies the first cause and the second cause, and then determines whether the first cause and the second cause are related at 608. If the causes are unidentifiable at 606, process 600 continues to 630, where control circuitry 404 presents prior avatars for user selection.

At 609, if the causes are related, process 600 continues to 610, where control circuitry 404 determines a plurality of common parameters between the first cause and the second cause, and then at 611, determines avatar sentimental and behavioral characteristics based on the common parameters. Process 600 continues from 611 to 621 as discussed below. At 609, if the causes are unrelated, process 600 continues to 615, where control circuitry 404 determines a first engagement level between the first user and the virtual assistant, and a second engagement level between the second user and the virtual assistant. At 616, control circuitry 404 determines a first importance score corresponding to the first cause and a second importance score corresponding to the second cause based on an event importance table (e.g., from storage 408 in FIG. 4, or data sources 516, 518 in FIG. 5). At 617, control circuitry 404 determines a first priority score corresponding to the first user by taking a first weighted sum of the first engagement level with a first weight and the first importance score with a second weight, and a second priority score corresponding to the second user by taking a second weighted sum of the second engagement level with the first weight and the second importance score with the second weight.

At 618, if the first priority score is higher than the second priority score, process 600 continues to 619, where control circuitry 404 determines avatar sentimental and behavioral characteristics based on the first cause. Or alternatively, at 618, if the first priority score is lower than the second priority score, process 600 continues to 620, where control circuitry 404 determines avatar sentimental and behavioral characteristics based on the second cause. At 621, control circuitry 404 presents, via a user interface (e.g., displayed on user equipment 106 in FIG. 1, and/or via the display 412 in FIG. 2, or any of 502, 504 and 506 in FIG. 5), the virtual assistant with the determined avatar sentimental and behavioral characteristics to the first user and the second user.

Figure 7:
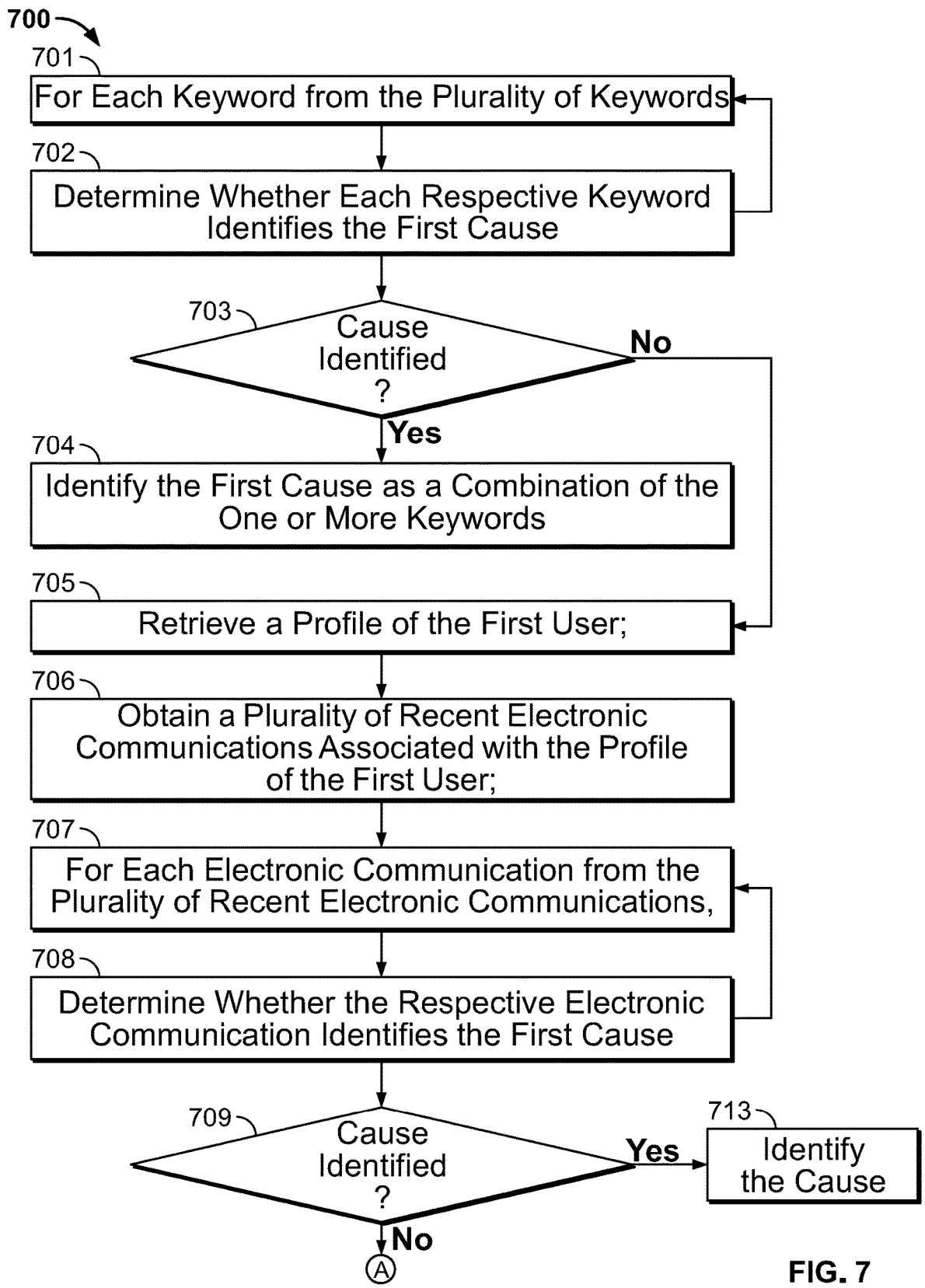
FIG. 7 depicts an illustrative flowchart of a process for determining a cause for a sentiment descriptor corresponding to a user, in accordance with some embodiments of the disclosure.
Figure 7:
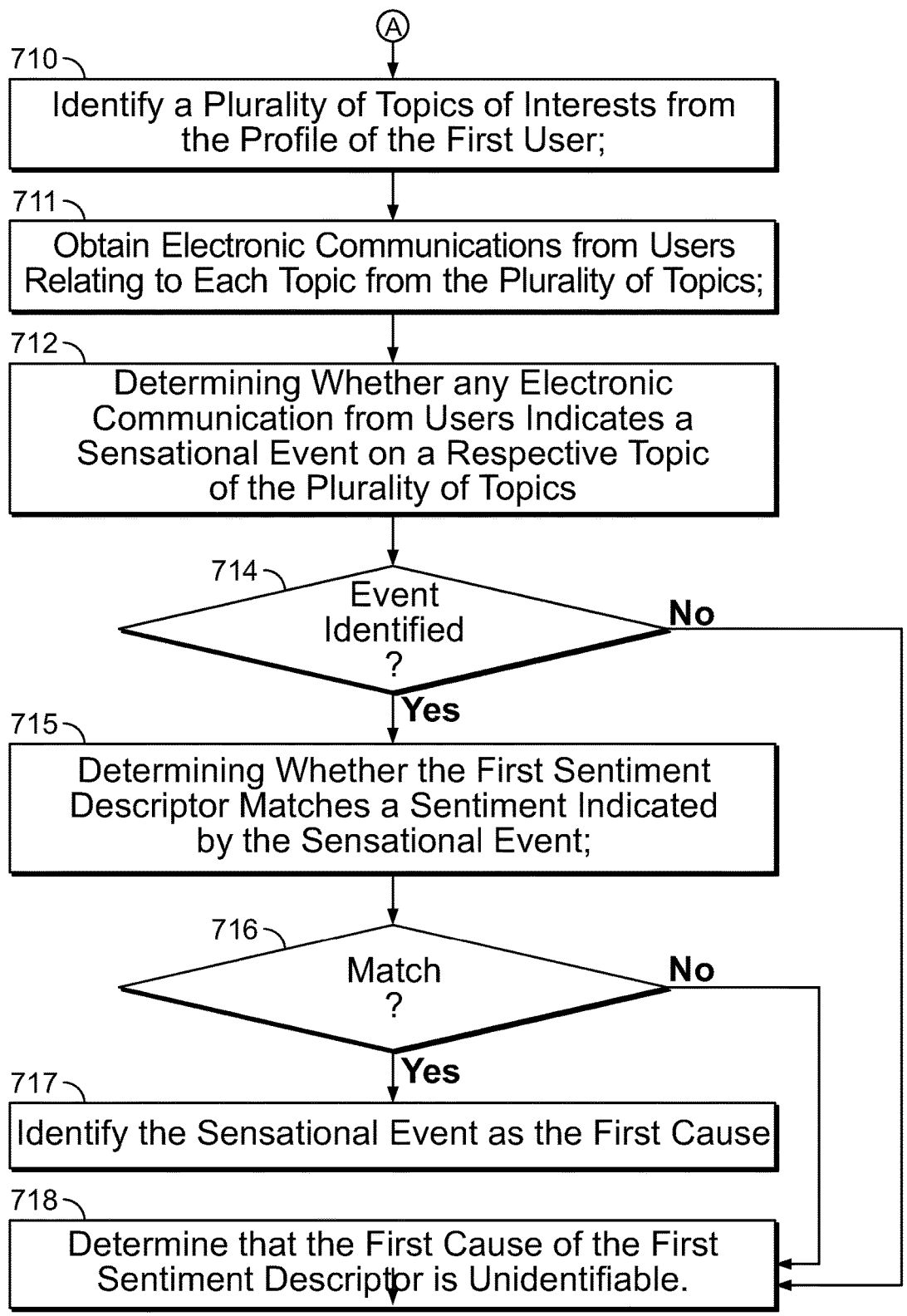

FIG. 7 depicts an illustrative flowchart of a process for determining a cause for a sentiment descriptor corresponding to a user, in accordance with some embodiments of the disclosure. Process 700 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 700 begins at 701, which continues and inherits parameters such as keywords of vocal communications of the users obtained during the monitoring (e.g., stored at RAM storage 408 in FIG. 4) from 604 in FIG. 6. For each keyword from the plurality of keywords at 701, control circuitry 404 determines whether each respective keyword identifies the first cause at 702. If a cause is identified at 703, control circuitry 404 identifies the first cause as a combination of the one or more keywords. If a cause is not identified at 703, control circuitry 404 retrieves a profile of the first user at 705.

Process 700 continues from 705 to 706, where control circuitry 404 obtains a plurality of recent electronic communications associated with the profile of the first user (e.g., from data sources 518 via communications network 514 in FIG. 5). At 707, control circuitry 404, for each electronic communication from the plurality of recent electronic communications, and at 708, determines whether the respective electronic communication identifies the first cause. At 709, if the cause is identified, control circuitry 404 identifies the cause from the electronic communication at 713. At 709, if the cause is not identified, control circuitry 404 identifies a plurality of topics of interests from the profile of the first user at 710. At 711, control circuitry 404 obtains electronic communications from users relating to each topic from the plurality of topics (e.g., from data sources 518 via communications network 514 in FIG. 5). At 712, control circuitry 404 determines whether any electronic communication from users indicates a sensational event on a respective topic of the plurality of topics.

Process 700 continues from 714 to 715, when an event is identified, where control circuitry 404 determines whether the first sentiment descriptor matches a sentiment indicated by the sensational event. At 716, if the first sentiment descriptor matches the sentiment indicated by the sensational event, control circuitry 404 identifies the sensational event as the first cause at 717. Back to 714, if no sensational event on the respective topic is identified, or at 716 where the first sentiment descriptor does not match the sentiment indicated by the sensational event, control circuitry 404 determines that the first cause of the first sentiment descriptor is unidentifiable.

Figure 8:
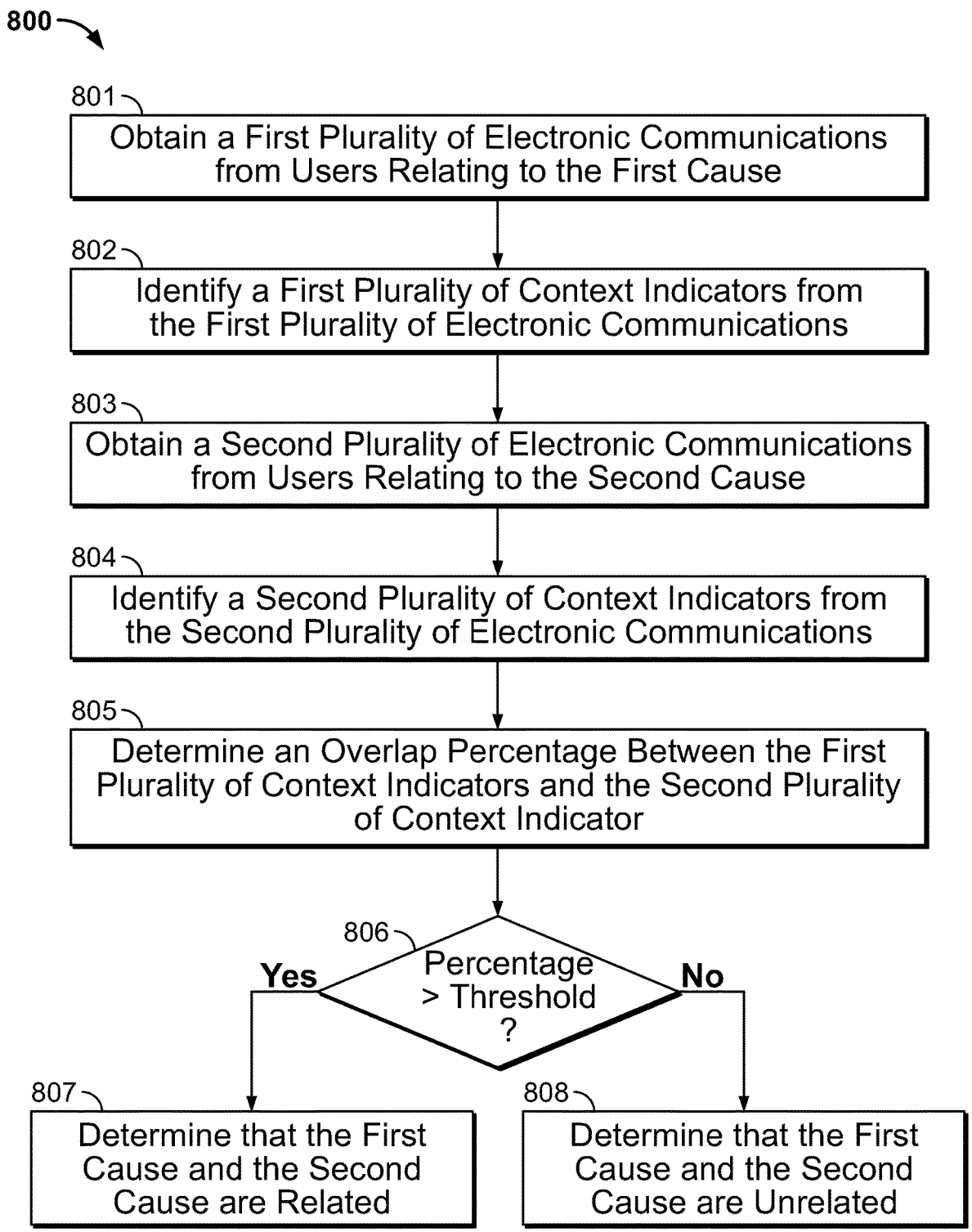
FIG. 8 depicts an illustrative flowchart of a process for determining whether two causes of the sentiment descriptors corresponding to two users are related, in accordance with some embodiments of the disclosure.

FIG. 8 depicts an illustrative flowchart of a process for determining whether two causes of the sentiment descriptors corresponding to two users are related, in accordance with some embodiments of the disclosure. Process 800 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 800 begins at 801, which continues and inherits parameters such as the first cause corresponding to the sentiment of the first user (e.g., stored at RAM storage 408 in FIG. 4) from 607 in FIG. 6, where control circuitry 404 obtains a first plurality of electronic communications from users relating to the first cause (e.g., from data sources 518 via communications network 514 in FIG. 5). At 802, control circuitry 404 identifies a first plurality of context indicators from the first plurality of electronic communications. At 803, control circuitry 404 obtains a second plurality of electronic communications from users relating to the second cause. At 804, control circuitry 404 identifies a second plurality of context indicators from the second plurality of electronic communications, where the obtained first plurality and second plurality of context indicators are stored at storage 408 in FIG. 4. At 805, control circuitry 404 determines an overlap percentage between the first plurality of context indicators and the second plurality of context indicators. At 806, if the overlap percentage is higher than a relevance threshold, control circuitry 404 determines that the first cause and the second cause are related at 807. Otherwise, if the overlap percentage is lower than a relevance threshold, control circuitry 404 determines that the first cause and the second cause are unrelated.

Figure 9:
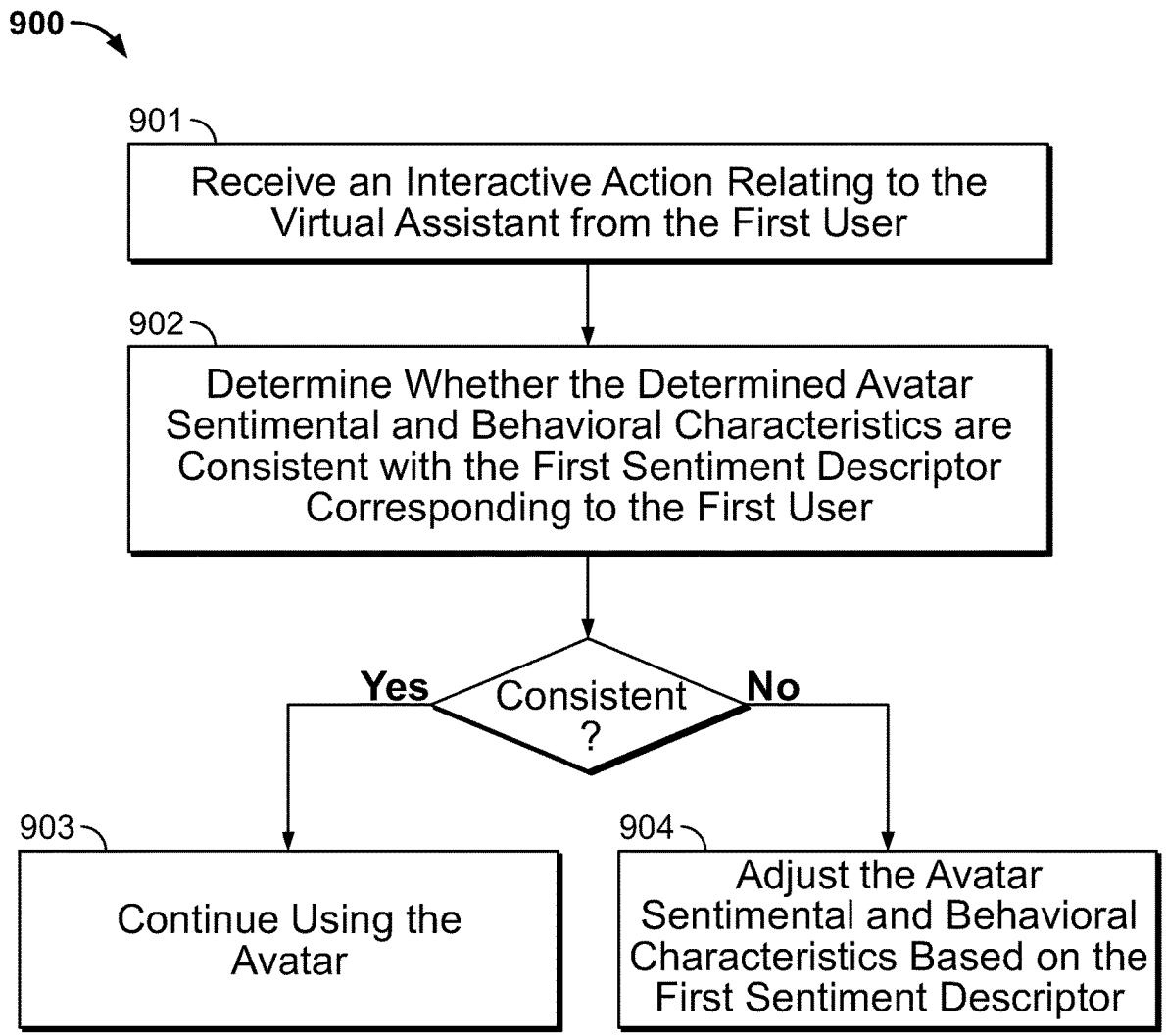
FIG. 9 depicts an illustrative flowchart of a process for adjusting avatar settings based on user feedback, in accordance with some embodiments of the disclosure.

FIG. 9 depicts an illustrative flowchart of a process for adjusting avatar settings based on user feedback, in accordance with some embodiments of the disclosure. Process 900 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 900 begins at 901, which continues and inherits parameters such as the presented avatar (e.g., displayed at user equipment 106 in FIG. 1, and/or via the display 412 in FIG. 2, or any of 502, 504 and 506 in FIG. 5) from 621 in FIG. 6. At 901, control circuitry 404 receives an interactive action relating to the virtual assistant from the first user (e.g., via user input interface 410 in FIG. 4). At 902, control circuitry 404 determines whether the determined avatar sentimental and behavioral characteristics are consistent with the first sentiment descriptor corresponding to the first user.

Process 900 continues to 903 when the determined avatar sentimental and behavioral characteristics are consistent with the first sentiment descriptor corresponding to the first user. At 903, control circuitry 404 continues using the avatar. Process 900 continues to 904 when the determined avatar sentimental and behavioral characteristics are inconsistent with the first sentiment descriptor corresponding to the first user, where control circuitry 404 adjusts the avatar sentimental and behavioral characteristics based on the first sentiment descriptor.

Figure 10:
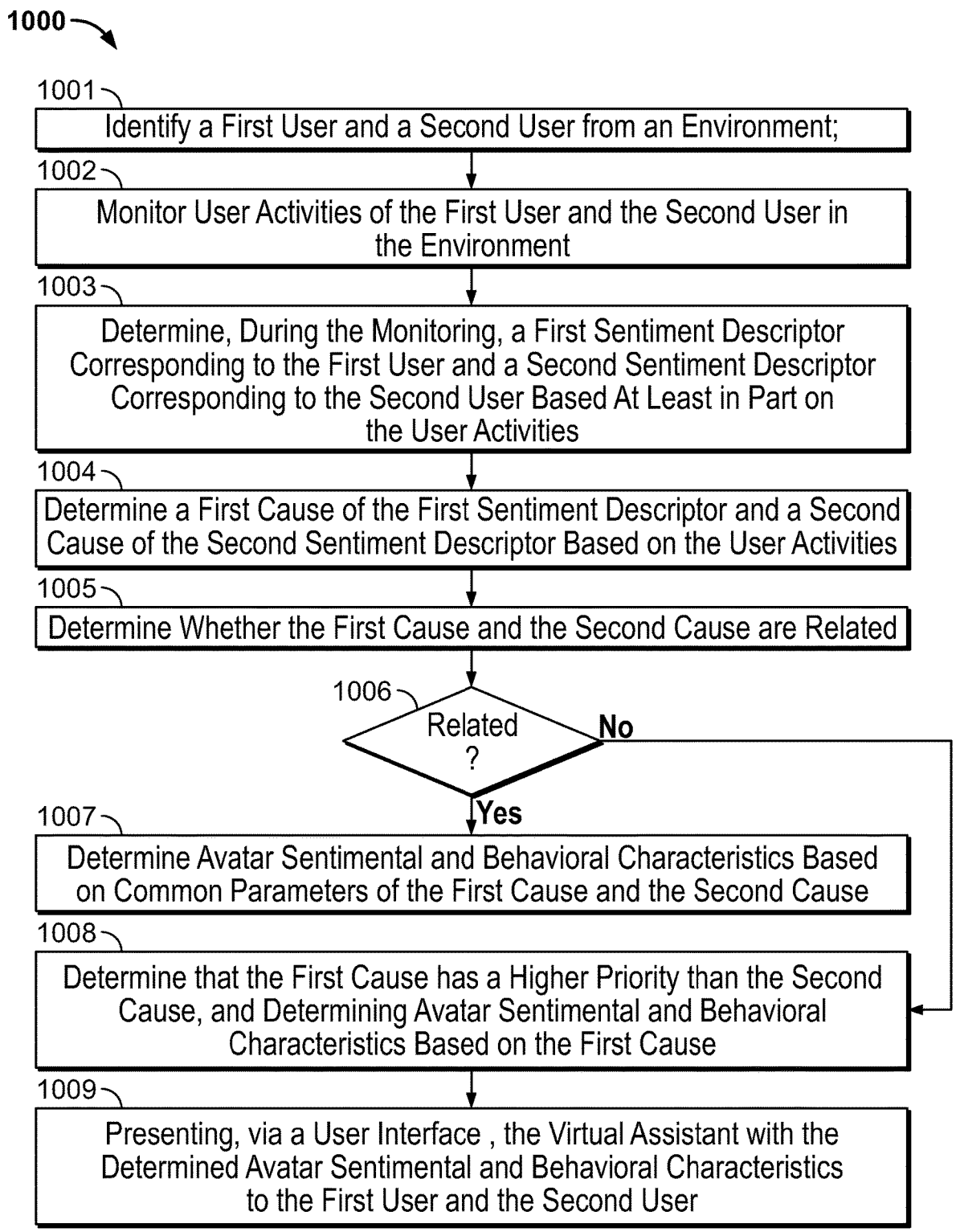
FIG. 10 depicts an illustrative flowchart of a process for providing a virtual assistant to accommodate different sentiments among a group of users, in accordance with alternative embodiments of the disclosure.

FIG. 10 depicts an illustrative flowchart of a process for providing a virtual assistant to accommodate different sentiments among a group of users, in accordance with alternative embodiments of the disclosure. Process 1000 may be executed by control circuitry 404 (e.g., in a manner instructed to control circuitry 404 by the media guidance application). Control circuitry 404 may be part of user equipment (e.g., user equipment 106 or 114, each of which may have any or all of the functionality of user television equipment 502, user computer equipment 504, and/or wireless communications device 506), or of a remote server separated from the user equipment by way of communications network 514.

Process 1000 begins at 1001, where control circuitry 404 identifies a first user and a second user from an environment (e.g., via user input interface 410 in FIG. 4). At 1002, control circuitry 404 monitors user activities of the first user and the second user in the environment (e.g., via user input interface 410 in FIG. 4). At 1003, control circuitry 404 determines, during the monitoring, a first sentiment descriptor corresponding to the first user and a second sentiment descriptor corresponding to the second user based at least in part on the user activities. At 1004, control circuitry 404 determines a first cause of the first sentiment descriptor and a second cause of the second sentiment descriptor based on the user activities. At 1005, control circuitry 404 determines whether the first cause and the second cause are related.

Process 1000 continues from 1006 to 1007, when the first cause and the second cause are related. At 1007, control circuitry 404 determines avatar sentimental and behavioral characteristics based on common parameters of the first cause and the second cause. Process 1000 continues from 1006 to 1008, when the first cause and the second cause are unrelated. At 1008, control circuitry 404 determines that the first cause has a higher priority than the second cause, and determines avatar sentimental and behavioral characteristics based on the first cause. At 1009, control circuitry 404 presents, via a user interface (e.g., displayed on user equipment 106 in FIG. 1, and/or via the display 412 in FIG. 2, or any of 502, 504 and 506 in FIG. 5), the virtual assistant with the determined avatar sentimental and behavioral characteristics to the first user and the second user.

It should be noted that although FIG. 1 depicts an example environment 100 including three users, and processes 600-1000 in FIGS. 6-10 describe an example scenario of two users, embodiments described herein are to be applied to an arbitrary number of users. For example, when there are a number of M users (M>2) in a group environment, the media guidance application may capture and identify a sentiment descriptor corresponding to each user, identify whether the cause of each respective sentiment descriptor is identifiable, and then determine whether the causes for the sentiments of the number of users are related in a similar way as described in FIGS. 1-10. Specifically, for the number of M users, the media guidance application may determine that if N (N<M) out of M users having relating causes of their sentiments, the media guidance application may configure the virtual assistant based on the common cause of the N users. For example, if the media guidance application has identified that four out of five users in a room exhibit different sentiments because of the result of "Championship Final," while the other user has an unidentifiable or unrelated cause of his or her sentiment, the media guidance application may configure the virtual assistant with an avatar relating to a soccer player character. When the causes for the sentiments of the number of users are determined to be unrelated, for example, for the number of M users, less than a number of N (N<M) users having relating causes of their sentiments, the media guidance application may compare the relative importance of the sentiment and the corresponding cause of each user, as described in FIGS. 1 and 6-10.

It should be noted that processes 600-1000 or any step thereof could be performed on, or provided by, any of the devices shown in, or described with respect to, FIGS. 1 and 4-5. For example, any of processes 600-900 may be executed by control circuitry 404 (FIG. 4) as instructed by control circuitry implemented on user equipment 106 (FIG. 1), 502, 504, 506 (FIG. 5), and/or a user equipment 114 (FIG. 1) for selecting a portion of the media asset for replaying. In addition, one or more steps of processes 600-900 may be incorporated into or combined with one or more steps of any other process or embodiment.

It is contemplated that the steps or descriptions of each of FIGS. 6-10 may be used with any other embodiment of this disclosure. In addition, the steps and descriptions described in relation to FIGS. 6-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-10.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a cause of a sentiment descriptor corresponding to a user, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, each sentiment descriptor and the cause for the sentiment descriptor associated therewith, as described herein, may be stored in, and retrieved from, storage 408 of FIG. 4, or media guidance data source 518 of FIG. 5. Furthermore, processing circuitry, or a computer program, may update configuration data of the media guidance application, which may be stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for providing, to a group of users, a virtual assistant with customized avatar sentimental and behavioral characteristics to accommodate different sentiments among the group of users, the method comprising:
receiving a request to initiate a virtual assistant;
identifying a first user and a second user from an environment;
in response to identifying the first user and the second user from the environment, monitoring user activities of the first user and the second user in the environment;
determining, during the monitoring, a first sentiment descriptor corresponding to the first user and a second sentiment descriptor corresponding to the second user based at least in part on the user activities;
determining whether a first cause of the first sentiment descriptor is identifiable and a second cause of the second sentiment descriptor is identifiable based on the user activities;
in response to determining that the first cause of the first sentiment descriptor and the second cause of the second sentiment descriptor are identifiable:
  identifying the first cause and the second cause;
  determining whether the first cause and the second cause are related;
  in response to determining that the first cause and the second cause are related, determining a plurality of common parameters between the first cause and the second cause, and determining avatar sentimental and behavioral characteristics based on the common parameters; and
  in response to determining that the first cause and the second cause are unrelated:
    determining a first engagement level between the first user and the virtual assistant, and a second engagement level between the second user and the virtual assistant;
    determining a first importance score corresponding to the first cause and a second importance score corresponding to the second cause based on an event importance table;
    determining a first priority score corresponding to the first user by taking a first weighted sum of the first engagement level with a first weight and the first importance score with a second weight;
    determining a second priority score corresponding to the second user by taking a second weighted sum of the second engagement level with the first weight and the second importance score with the second weight;
    in response to determining that the first priority score is higher than the second priority score, determining avatar sentimental and behavioral characteristics based on the first cause; and
presenting, via a user interface, the virtual assistant with the determined avatar sentimental and behavioral characteristics to the first user and the second user.

2. The method of claim 1, wherein determining, during the monitoring, the first sentiment descriptor and the second sentiment descriptor comprises:
obtaining, from the monitoring, a voice communication from the first user;
extracting a plurality of keywords from the voice communication by speech recognition;
for each keyword from the plurality of keywords, querying a database of sentiment descriptors based on each respective keyword to obtain one or more sentiment descriptors that match one or more keywords from the plurality of keywords; and
in response to obtaining the one or more sentiment descriptors, selecting a sentiment descriptor that matches the most keywords from the plurality of keywords as the first sentiment descriptor.

3. The method of claim 2, further comprising:
in response to obtaining no sentiment descriptor from the querying:
obtaining a speech waveform representing the voice communication;
determining a frequency pattern of the speech waveform representing a tone of the voice communication; and
determining the first sentiment descriptor corresponding to the frequency pattern.

4. The method of claim 2, wherein determining whether the first cause of the first sentiment descriptor is identifiable comprises:
for each keyword from the plurality of keywords, determining whether each respective keyword identifies the first cause;
in response to determining that one or more keywords from the plurality of keywords identifies the first cause, identifying the first cause as a combination of the one or more keywords;
in response to determining that no keyword from the plurality of keywords identifies the first cause:
retrieving a profile of the first user;
obtaining a plurality of recent electronic communications associated with the profile of the first user;
for each electronic communication from the plurality of recent electronic communications, determining whether the respective electronic communication identifies the first cause; and
in response to determining that no electronic communication identifies the first cause:
  identifying a plurality of topics of interests from the profile of the first user;
  obtaining electronic communications from users relating to each topic from the plurality of topics;
  determining whether any electronic communication from users indicates a sensational event on a respective topic of the plurality of topics;
  in response to determining that an electronic communication from users indicates a sensational event on a respective topic, determining whether the first sentiment descriptor matches a sentiment indicated by the sensational event;
  in response to determining that the first sentiment descriptor matches the sentiment indicated by the sensational event, identifying the sensational event as the first cause; and
  in response to determining that the first sentiment descriptor does not match the sentiment indicated by the sensational event, determining that the first cause of the first sentiment descriptor is unidentifiable.

5. The method of claim 4, further comprising:
in response to determining that the first cause of the first sentiment descriptor is unidentifiable, providing a first avatar option of a first previously used avatar for the first user and a second avatar option of a second previously used avatar for the second user; and receiving a selection of one of the first avatar option and the second avatar option.

6. The method of claim 1, wherein determining, during the monitoring, the first sentiment descriptor and the second sentiment descriptor further comprises:
obtaining biometric data relating to the first user;
extracting characteristics from the biometric data;
mapping, based on a mapping table of sentiment descriptors and biometric characteristics, the characteristics to a plurality of mapped sentiment descriptors, each sentiment descriptor from the plurality of mapped sentiment descriptors corresponding to a matching score; and
selecting a sentiment descriptor from the plurality of mapped sentiment descriptors that has the highest matching score as the first sentiment descriptor.

7. The method of claim 1, wherein determining whether the first cause and the second cause are related comprises:
obtaining a first plurality of electronic communications from users relating to the first cause;
identifying a first plurality of context indicators from the first plurality of electronic communications;
obtaining a second plurality of electronic communications from users relating to the second cause;
identifying a second plurality of context indicators from the second plurality of electronic communications;
determining an overlap percentage between the first plurality of context indicators and the second plurality of context indicators;
in response to determining that the overlap percentage is higher than a relevance threshold, determining that the first cause and the second cause are related; and
in response to determining that the overlap percentage is no higher than the relevance threshold, determining that the first cause and the second cause are unrelated.

8. The method of claim 7, wherein determining the plurality of common parameters between the first cause and the second cause comprises:
identifying the plurality of common parameters based on an intersect between the first plurality of context indicators and the second plurality of context indicators.

9. The method of claim 1, wherein determining a first importance score corresponding to the first cause comprises:
retrieving, from a database, the event importance table that maps a type of event to an importance score;
determining one or more query terms based on the first cause;
querying the event importance table based on the one or more query terms to obtain one or more respective importance scores; and
calculating the first importance score by taking an average of the one or more respective importance scores.

10. The method of claim 1, further comprising:
in response to presenting, via the user interface, the virtual assistant with the determined avatar sentimental and behavioral characteristics to the first user and the second user, receiving an interactive action relating to the virtual assistant from the first user;
determining whether the determined avatar sentimental and behavioral characteristics are consistent with the first sentiment descriptor corresponding to the first user; and
in response to determining that the determined avatar sentimental and behavioral characteristics are inconsistent with the first sentiment descriptor corresponding to the first user, adjusting the avatar sentimental and behavioral characteristics based on the first sentiment descriptor.

11. A system for providing, to a group of users, a virtual assistant with customized avatar sentimental and behavioral characteristics to accommodate different sentiments among the group of users, the system comprising:
communication circuitry;
input/output circuitry; and
control circuitry configured to:
receive, via the user interface, a request to initiate a virtual assistant;
identify a first user and a second user from an environment;
in response to identifying the first user and the second user from the environment, monitor, via the communication circuitry, user activities of the first user and the second user in the environment;
determine, during the monitoring, a first sentiment descriptor corresponding to the first user and a second sentiment descriptor corresponding to the second user based at least in part on the user activities;
determine whether a first cause of the first sentiment descriptor is identifiable and a second cause of the second sentiment descriptor is identifiable based on the user activities;
in response to determining that the first cause of the first sentiment descriptor and the second cause of the second sentiment descriptor are identifiable:
identify the first cause and the second cause;
determine whether the first cause and the second cause are related;
in response to determining that the first cause and the second cause are related, determine a plurality of common parameters between the first cause and the second cause, and determining avatar sentimental and behavioral characteristics based on the common parameters; and
in response to determining that the first cause and the second cause are unrelated:
determine a first engagement level between the first user and the virtual assistant, and a second engagement level between the second user and the virtual assistant;
determine a first importance score corresponding to the first cause and a second importance score corresponding to the second cause based on an event importance table;
determine a first priority score corresponding to the first user by taking a first weighted sum of the first engagement level with a first weight and the first importance score with a second weight;
determine a second priority score corresponding to the second user by taking a second weighted sum of the second engagement level with the first weight and the second importance score with the second weight;
in response to determining that the first priority score is higher than the second priority score, determine avatar sentimental and behavioral characteristics based on the first cause; and
present, via the input/output circuitry, the virtual assistant with the determined avatar sentimental and behavioral characteristics to the first user and the second user.

12. The system of claim 11, wherein the control circuitry is further configured, when determining, during the monitoring, the first sentiment descriptor and the second sentiment descriptor, to:

obtain, from the monitoring, a voice communication from the first user;
extract a plurality of keywords from the voice communication by speech recognition;
for each keyword from the plurality of keywords, query a database of sentiment descriptors based on each respective keyword to obtain one or more sentiment descriptors that match one or more keywords from the plurality of keywords; and
in response to obtaining the one or more sentiment descriptors, select a sentiment descriptor that matches the most keywords from the plurality of keywords as the first sentiment descriptor.

13. The system of claim 12, wherein the control circuitry is further configured to:
in response to obtaining no sentiment descriptor from the querying:
obtain a speech waveform representing the voice communication;
determine a frequency pattern of the speech waveform representing a tone of the voice communication; and
determine the first sentiment descriptor corresponding to the frequency pattern.

14. The system of claim 12, wherein the control circuitry is further configured, when determining whether the first cause of the first sentiment descriptor is identifiable, to:
for each keyword from the plurality of keywords, determine whether each respective keyword identifies the first cause;
in response to determining that one or more keywords from the plurality of keywords identifies the first cause, identify the first cause as a combination of the one or more keywords;
in response to determining that no keyword from the plurality of keywords identifies the first cause:
retrieve a profile of the first user;
obtain a plurality of recent electronic communications associated with the profile of the first user;
for each electronic communication from the plurality of recent electronic communications, determine whether the respective electronic communication identifies the first cause; and
in response to determining that no electronic communication identifies the first cause:
identify a plurality of topics of interests from the profile of the first user;
obtain electronic communications from users relating to each topic from the plurality of topics;
determine whether any electronic communication from users indicates a sensational event on a respective topic of the plurality of topics;
in response to determining that an electronic communication from users indicates a sensational event on a respective topic, determine whether the first sentiment descriptor matches a sentiment indicated by the sensational event;
in response to determining that the first sentiment descriptor matches the sentiment indicated by the sensational event, identify the sensational event as the first cause; and
in response to determining that the first sentiment descriptor does not match the sentiment indicated by the sensational event, determine that the first cause of the first sentiment descriptor is unidentifiable.

15. The system of claim 14, wherein the control circuitry is further configured to:

in response to determining that the first cause of the first sentiment descriptor is unidentifiable, provide a first avatar option of a first previously used avatar for the first user and a second avatar option of a second previously used avatar for the second user; and
receive a selection of one of the first avatar option and the second avatar option.

16. The system of claim 11, wherein the control circuitry is further configured, when determining, during the monitoring, the first sentiment descriptor and the second sentiment descriptor, to:
obtain biometric data relating to the first user;
extract characteristics from the biometric data;
map, based on a mapping table of sentiment descriptors and biometric characteristics, the characteristics to a plurality of mapped sentiment descriptors, each sentiment descriptor from the plurality of mapped sentiment descriptors corresponding to a matching score; and
select a sentiment descriptor from the plurality of mapped sentiment descriptors that has the highest matching score as the first sentiment descriptor.

17. The system of claim 11, wherein the control circuitry is further configured, when determining whether the first cause and the second cause are related, to:
obtain a first plurality of electronic communications from users relating to the first cause;
identify a first plurality of context indicators from the first plurality of electronic communications;
obtain a second plurality of electronic communications from users relating to the second cause;
identify a second plurality of context indicators from the second plurality of electronic communications;
determine an overlap percentage between the first plurality of context indicators and the second plurality of context indicators;
in response to determining that the overlap percentage is higher than a relevance threshold, determine that the first cause and the second cause are related; and
in response to determining that the overlap percentage is no higher than the relevance threshold, determine that the first cause and the second cause are unrelated.

18. The system of claim 17, wherein the control circuitry is further configured, when determining the plurality of common parameters between the first cause and the second cause, to:
identify the plurality of common parameters based on an intersect between the first plurality of context indicators and the second plurality of context indicators.

19. The system of claim 11, wherein the control circuitry is further configured, when determining a first importance score corresponding to the first cause, to:
retrieve, from a database, the event importance table that maps a type of event to an importance score;
determine one or more query terms based on the first cause;
query the event importance table based on the one or more query terms to obtain one or more respective importance scores; and
calculate the first importance score by taking an average of the one or more respective importance scores.

20. The system of claim 11, wherein the control circuitry is further configured to:
in response to presenting, via the user interface, the virtual assistant with the determined avatar sentimental and behavioral characteristics to the first user and the second user, receive an interactive action relating to the virtual assistant from the first user;

determine whether the determined avatar sentimental and behavioral characteristics are consistent with the first sentiment descriptor corresponding to the first user; and in response to determining that the determined avatar sentimental and behavioral characteristics are inconsistent with the first sentiment descriptor corresponding to the first user, adjust the avatar sentimental and behavioral characteristics based on the first sentiment descriptor.

* * * * *